United States Patent [19]
Bailly et al.

[11] Patent Number: 5,481,935
[45] Date of Patent: Jan. 9, 1996

[54] GEARSHIFTING ARRANGEMENT FOR ACTUATING MOTOR VEHICLE MULTI-SPEED GEARBOXES

[75] Inventors: Gerhard Bailly; Ünal Gazyakan, both of Friedrichshafen, Germany

[73] Assignee: ZF Friedrichshafen AG, Germany

[21] Appl. No.: 211,930

[22] PCT Filed: Nov. 12, 1992

[86] PCT No.: PCT/EP92/02604

§ 371 Date: Apr. 20, 1994

§ 102(e) Date: Apr. 20, 1994

[87] PCT Pub. No.: WO93/10377

PCT Pub. Date: May 27, 1993

[30] Foreign Application Priority Data

Nov. 12, 1991 [DE] Germany .......................... 41 37 145.3

[51] Int. Cl.$^6$ .................................................. F16H 63/36
[52] U.S. Cl. ................................................................ 74/477
[58] Field of Search .............................. 74/477, 483 PB

[56] References Cited

U.S. PATENT DOCUMENTS

| | | | |
|---|---|---|---|
| 3,131,795 | 5/1964 | Shimanckas | 74/483 PB X |
| 3,626,781 | 12/1971 | Moser | 74/477 |
| 3,955,437 | 5/1976 | Heintz | 74/473 R |

FOREIGN PATENT DOCUMENTS

| | | |
|---|---|---|
| 1780027 | 12/1971 | Germany . |
| 2550484 | 5/1976 | Germany . |
| 2750275 | 4/1982 | Germany . |
| 1268847 | 3/1972 | United Kingdom . |

*Primary Examiner*—Allan D. Herrmann
*Attorney, Agent, or Firm*—Davis, Bujold & Streck

[57] ABSTRACT

A system for shifting gears in a multi-speed motor vehicle transmission in which a single gearshifting element, in the form of a connecting rod (1), is moveable in a direction parallel to the rotational axis (33) of the transmission (T) gears (31). A plurality of individually actuatable coupling mechanisms (4, 4', 4', 18), upon actuation, selectively couple corresponding gearshifting levers (12, 12') with the connecting rod. The gearshifting levers (12, 12') are, in turn, operably connected to gearshifting sleeves (30, 30') of the transmission (T). When a coupling mechanism is individually activated, the corresponding gearshifting lever is pivoted by the connecting rod (1) for selectively engaging or disengaging a corresponding gear of the transmission, via the corresponding gearshifting sleeve (30, 30').

19 Claims, 1 Drawing Sheet

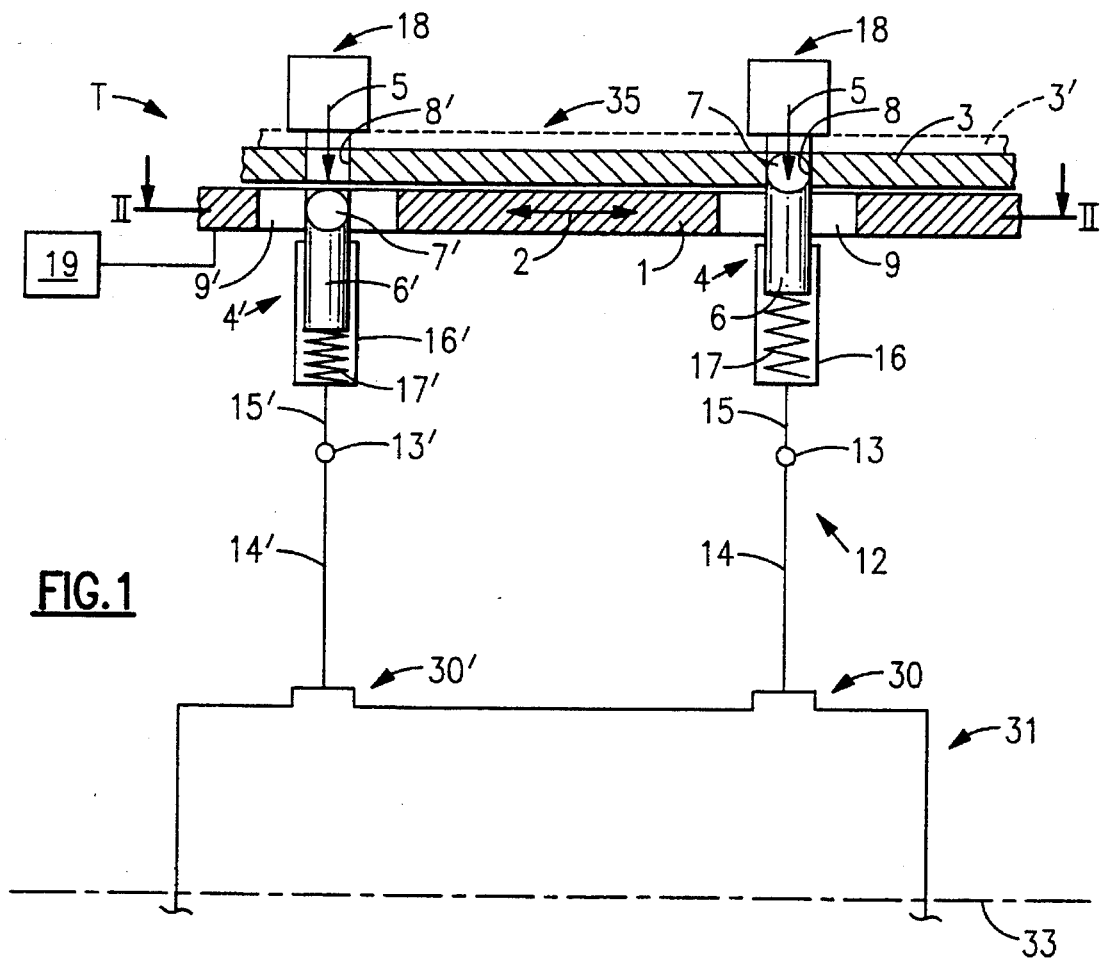

GEARSHIFTING ARRANGEMENT FOR ACTUATING MOTOR VEHICLE MULTI-SPEED GEARBOXES

FIELD OF THE INVENTION

The invention concerns gearshifting arrangements for actuating motor vehicle multi-speed transmissions wherein electric motors are used for actuating the gearshifting sets of the transmission.

BACKGROUND OF THE INVENTION

Existing multi-speed transmissions include gearshifting arrangements where the gearshifting force required is partly or wholly supplied by the vehicle's own source of energy. They have the disadvantages that no simple control of the gearshifting force is possible (especially in the pneumatic) and that relatively expensive parts are needed. Sources of energy likewise are not available in all vehicles wherefore they must be additionally installed when required.

An electric power supply which performs a multiplicity of tasks in a vehicle offers itself as a source of energy present in any vehicle. A modification for the importance of control is relatively easily possible. The trend in modern vehicles is toward electronic control of vehicle functions (for instance, automatic transmission, injection and ignition systems, ASC). It appears important to supply the same energy to the control range and the power range. In an electrically actuated transmission this means that an unnecessary change in the kind of energy used in the system of shift control and production of shifting force is avoided. Advantages are to be seen, for instance, in the travel and time-dependent control of the shifting force.

SUMMARY OF THE INVENTION

The gearshifting arrangement of the invention accordingly has a single connecting rod, as an essential gearshifting element, displaceable parallel with the axle of the transmission wheels in the neutral and the gearshifting positions and several coupling mechanisms each coordinated with one of the gearshifting levers. Said coupling mechanisms in an inactivated state, that is when no coupling force is acting, respectively immovably fix an unactuated gearshifting lever in its neutral position to a part fixed to the housing, the connecting rod simultaneously being able to perform unhindered the gearshifting movements. Hereby a movement of the gearshifting levers leading to an unintended introduction of a gear cannot occur. In an actuated or engaged state, the separately actuatable coupling mechanisms produce an operative connection between the connecting rod and a respective gearshifting lever whereby the connection of the gearshifting lever, with the part fixed to the housing, is simultaneously disconnected so that the gearshifting levers can perform unhindered the gearshifting movements of the connecting rod. The several gearshifting levers of the motor vehicle multi-speed transmission consequently are each separately coupled with a single connecting rod that transmits gearshifting force. The coupling mechanism is designed in such a manner that each coupling mechanism can be actuated independently of the remaining coupling mechanisms but, at the same time, grip the same connecting rod available for actuation of the remaining gearshifting levers.

In a further development of the idea of the invention, the coupling mechanism has a coupling bolt, which extends perpendicular to the gearshifting direction of movement of the connecting rod or the direction of the gearshifting force and is simultaneously movable in an axial direction of the gearshifting arm, being mounted by one end to the gearshifting arm and the other end meshing either positively in the part fixed to the housing or in the connecting rod, depending on the action or lack of action of a coupling force. In the coupled state, the lever can be moved together with the connecting rod, while in the uncoupled and locked state the lever is immovably fixed and, at the same time, allows other gearshifting movements of the connecting rod.

In addition, it is advantageous that the coupling mechanism has a coupling bolt with a coupling shaft connected with the arm of the gearshifting lever and with a coupling head which positively meshes in corresponding recesses in the connecting rod and in the part fixed to the housing and is extendible in and out of said recesses. By a simple geometric design of the coupling shaft and the coupling head, simple recesses can be made in the connecting rod and the part fixed to the housing so as to make possible the obtention of arrangements that are advantageous in the manufacture and assembly processes.

The connecting rod can be moved into the three gearshifting positions, that is, a central neutral position and, as seen in the direction of movement, forward and reverse positions, by an electromotor connected, for instance, with a threaded spindle or by a pneumatically or hydraulically actuated cylinder having three positions.

It is advantageous to provide longitudinal holes in the connecting rod extending in a gearshifting direction through which, in an uncoupled state, movably pass the coupling shafts of the coupling bolts. Therefore, if a gear is introduced, only one gearshifting lever is always connected with the connecting rod via the coupling bolts while the remaining gearshifting levers are firmly retained by the coupling bolts in the part fixed to the housing so as to enable the connecting rod to move unhindered out of the neutral coupling position to the corresponding gear selecting position always carrying along only the coupled gearshifting lever.

According to another advantageous embodiment, the coupling bolt or bolts are substantially T-shaped, the beam of the head part being situated in an assembled operating state across the gearshifting direction of the shift rod. In the gearshifting rod, altogether substantially cross-shaped recesses are adequately provided, the longitudinal slots of the cross-shaped recesses constituting the longitudinal holes for the passage of the coupling shafts while the transverse slots are designed for engaging the coupling heads, that is, the beam of the head part. It can be advantageous here if the coupling bolt has both on its coupling shaft and on its coupling head a substantially identical cross section. Hereby the openings, that is, the cross recesses in the connecting rod, are identical in the longitudinal and the transverse direction and so is the recess in the housing wall for the coupling head and the coupling shaft, which likewise contribute to a simpler mode of production.

The coupling head in addition can also have a round or oval plate shape. In case of a design of the coupling bolt and coupling shaft of a round cross section and a coupling head in the shape of a round plate, a rotary part of relatively inexpensive manufacture is altogether obtained. The corresponding apertures in the housing wall and connecting rod are then accordingly round apertures.

Finally, the coupling bolts can be substantially L-shaped whereby they can be manufactured by bending/rounding off out of an adequate sectional pin having a round or rectangular cross section. The apertures in the housing and connecting rod are then adequately made projecting on one side in relation to the longitudinal axis of the connecting rod, forming in the later a substantially T-shaped recess.

Here the connecting rod that transmits the force to the gearshifting levers can be made of flat steel so that it constitutes altogether an easy to manufacture part with geometrically simple apertures which, aside from the simple manufacture, also require very small space in the interior of the transmission housing. However, the connecting rod can also be made of any desired sectional steel that increases the bending resistance such as T-shaped or L-shaped sectional steel or be provided with a groove. It is of particular advantage if the part fixed to the housing is an outer wall of the housing and the connecting rod is situated between the outer housing wall and the outer end of the gearshifting arm of the gearshifting lever. The part fixed to the housing can also be a structural part fastened to the inner or the outer surface of the housing wall such as a flat or light flange-shaped plate. From the point of view of production engineering, this has a great advantage that the aperture 8 to be machined precisely for securing the coupling head is to be placed not in the housing wall but in the plate that can be easily made separately. When the plate is situated on the out side of the housing wall, when casting the housing, only one large opening covered by the plate has to be provided in the housing wall.

Another very advantageous embodiment is obtained by mounting the coupling shaft, movably guided in the direction of the selector or the coupling force, on the outer end of the gearshifting arm of a gearshifting lever, either the coupling shaft or the gearshifting arm being developed to form guide parts which slide with guidance into each other in the direction of their longitudinal extension. Thus, for instance, the outer end of the gearshifting arm can be enlarged to form a guide cylinder or be provided with a guide cylinder in which slides an axially movably coupling shaft of the coupling bolt, said shaft having a round cross section and being bar-shaped. It is of advantage that a pressure spring be situated between the front sides of the ends of both parts, that is of the arm and of the shaft, which when the coupling bolts are unactivated, that is unengaged or uncoupled, maintains them pressed out of the rod into the corresponding aperture in the housing wall. Only for the purpose of coupling with the connecting rod through the coupling bolt of the gearshifting lever must a coupling force be applied which against the force of the pressure spring presses the coupling bolt with the coupling head out of the housing recess and into the transverse slot of the cross recess in the connecting rod, accomplishing the coupling of the connecting rod with the gearshifting lever. Here the device which produces said selector or coupling force can be an electromagnetic device, or a hydraulic or a pneumatic cylinder, or any other device. These can be respectively fastened outside the cylinder housing, for instance, to the outer surface of the housing wall so that by virtue of said devices no space must be made available in the interior of the transmission housing. Besides, the coupling bolt can be inserted in a simple manner from out side of the housing after assembling the connecting rod. Thereafter, the actuation devices are likewise mounted from outside whereby the simplest possible assembly of the coupling mechanism can be obtained.

Altogether it can be summarily said that by virtue of the design of the gearshifting arrangement, according to the invention, the possibility of coupling separate gearshifting levers on the gearshifting rod without moving other levers is attained. The coupling bolts can be inserted through the rod without a coupling resulting. A reliable connection of the lever to the housing becomes possible. In addition, the very important requirements, namely, simple manufacture and assembly in a small building space are optimally met.

BRIEF DESCRIPTION OF THE DRAWINGS

The invention is explained in more detail herebelow with reference to an embodiment and the drawings.

In the drawings:

FIG. 1 shows a diagrammatic cross sectional view, along line I—I of FIG. 2, through a gearshifting arrangement with two gearshifting levers, with one gearshifting lever in a coupled state and a second gearshifting lever in an uncoupled state; and FIG. 2 shows a sectional view along line II—II of FIG. 1 through the connecting rod illustrating the position of the coupling head in a coupled and in an uncoupled and locked state of the gearshifting lever; and FIG. 3 shows a diagrammatic cross sectional view along line I—I of FIG. 1 of a modified coupling bolt having a rectangular cross section and an L-shape.

DETAILED DESCRIPTION OF THE PREFERRED EMBODIMENTS

As it can be especially seen in FIG. 1, the gearshifting arrangement according to the invention essentially consists of one connecting rod 1, the manufacture of which from a flat steel material can be well understood with reference to the illustration of FIG. 2. The connecting rod 1 is movable along the direction of the gearshifting force, clearly indicated with a black arrow 2, into the corresponding three gearshifting positions, that is, a central neutral position and gearshifting positions (left and right) shown in the drawing, and is secured to a part 3 fixed to the wall 3'(shown in ghost) of the housing, or as shown here secured directly to the housing wall 3, specifically in immediate proximity thereof and possibly sliding directly thereon.

Other essential components of the gearshifting arrangement are constituted by coupling bolts 4, 4' which, extend perpendicular to, vertical in the drawing, the width of the connecting rod 1 and are movably situated in corresponding apertures 8, 8', 9, 9' in the housing wall 3 and the connecting rod 1. The displacement of the coupling bolts 4, 4' is produced via selector and coupling forces indicated in the drawing by a vertical arrow 5. The corresponding devices 18, located on an outer surface 35 of the housing 3, 3', that produce the selector forces 5 and the device 19 that produces the gearshifting force 2 can be electric or electromagnetic devices, hydraulically or pneumatically actuated cylinders, or any other device.

In the embodiment shown in FIG. 2, the coupling bolt 4, or coupling bolts 4, 4' , are T-shaped, each having one coupling shaft 6, 6' and one coupling head 7, 7' which are aligned substantially perpendicular to one another and have substantially identical round cross in FIGS. 1 and 2. The corresponding apertures 8, 8' in the housing wall 3 are adapted to the shape of the coupling housing 7, 7' that is, designed in a manner such that the coupling heads can be easily engaged and disengaged. At least a small but also large inlet slopes on the engagement and disengagement sides can also be of advantage here.

Cross-shaped openings or recesses 9, 9' which are composed of a transverse slot 10, 10' and a longitudinal slot 11, 11' are provided in the connecting rod 1. The transverse slot 10, 10' corresponds to the aperture 8, 8' in the housing wall 3, especially with regard to the dimensions, and likewise serves to accommodate the coupling head 7, 7' but in a coupled state. However, the transverse slot 10, 10' of the rod can also be designed somewhat wider than the corresponding aperture 8, 8' of the housing whereby an easier coupling is possible, especially in case of a high gearshifting speed. The longitudinal slot 11, 11' in turn is designed, at least in its transverse dimensions, similarly to the transverse slot 10, 10' in its longitudinal dimension, that is, for movable accommodation of the coupling shaft 6, 6' wherein special care must be taken that said accommodation be made frictionless in order to help maintain as low as possible the gearshifting forces of the gearshifting rod. The cross-shaped openings, especially the transverse slot 10, 10' thereof, obviously can also be provided with inlet slopes both in the vertical and the horizontal directions in order to make a smooth engagement or coupling possible.

Gearshifting levers 12, 12' also are part of the gearshifting arrangement which, in a manner known per se, are each pivotable around a fulcrum 13, 13' fixed to the housing in such a manner that their lower gearshifting forks 14, 14' with gearshifting sleeves 30, 30' or similar gear selector parts not shown, effect the engagement of the gear or gear step adequately selected, the transmission's T gear set with gear axis 33 is diagrammatically illustrated at 31. In addition, each gearshifting lever 12, 12' has a gearshifting arm 15, 15' which extends substantially in the same plane as the gearshifting fork 14, 14' and serves for assuming the gearshifting force 5 in a coupled state of the gearshifting lever 12, 12'.

The upper end of the gearshifting arm 15, 15' is enlarged to form a guide cylinder 16, 16' or its upper end can be provided with such a guide cylinder 16, 16'. But any other axial guide can also be used. The coupling shaft 6, 6' of the coupling bolt 4, 4' is situated in a cylindrical inner aperture of the guide cylinder 16, 16' and axially movably guided. A pressure return spring 17, 17' is situated between a lower front surface of the coupling shaft 6, 6' and a bottom surface of the cylinder guide 16, 16'. Said pressure spring 17 is prestressed so as to bias the coupling bolt 4, 4' upwardly, that is, in the direction to the housing wall 3. Thus, in the absence of the selector or coupling force 5 and in a neutral or a central position of the connecting rod 1, the coupling bolt 4, 4', with its coupling head 7, 7', is maintained in engagement with the aperture 8, 8' of the housing wall 3. Thereby, the gearshifting lever 12, 12' is stationarily fixed to the housing wall 3 so as to rule out an undesired movement of the gearshifting lever and thus an unintended engagement or disengagement of a gear. As can be understood from FIGS. 1 and 2 and especially from the position on the right, the lever, in an uncoupled and locked state, can be reliably fixed and, at the same time, the connecting rod 1 be moved unhindered, for instance, to swivel a coupled gearshifting lever 12, 12', as shown in the example on the left.

As already mentioned, several coupling mechanisms with coupling bolts 4, 4' can be associated with a connecting rod 1, one coupling mechanism interacting with each gearshifting lever 12, 12'. Here only one coupling mechanism is always actuated, that is, only one gearshifting lever 12, 12' is always coupled via a coupling bolt 4, 4' with the gearshifting lever 1, as shown on the left in the case of the drawing. All the remaining coupling mechanisms are not actuated, that is, all the remaining gearshifting levers 12, 12' are stationarily fixed to the housing wall 3 by the coupling bolts 4, 4'. Thus, only one lever 12, 12' is always moved by the connecting rod 1 via the corresponding bolt 4, 4' while the remaining gearshifting levers stay stationarily fixed by the coupling bolts 4, 4'. Only when another gear is selected, for instance, by the gearshifting lever shown on the left in the drawing, will the selector or coupling force 5 fail whereby the coupling bolt 4, 4', due to the force of the pressure spring 17, 17', biases the coupling head 7, 7' into the aperture 8, 8' in the housing wall 3 fixing the lever 12, 12'. Another gearshifting lever is simultaneously selected, for instance, the one shown on the right in the drawing; a corresponding coupling device is accordingly actuated which presses the coupling bolt 4 out of the aperture 8, 8' of the housing wall 3 and into the cross-shaped opening 9, 9' of the connecting rod 1 in a manner such that the coupling head 7, 7' fully engages with the transverse slot 10. Thereafter, said last coupled gearshifting lever can be swiveled to the left or to the right into a corresponding gearshift position and thereby the corresponding gearshift pairs are activated via the gearshifting fork 14, 14'.

| List of Reference Numerals | |
|---|---|
| 1 | connecting rod |
| 2 | direction of the gearshifting force |
| 3 | housing wall/part fixed to the housing |
| 4 | coupling bolts |
| 5 | selector or coupling force |
| 6 | coupling shaft |
| 7 | coupling head |
| 8 | housing opening/aperture |
| 9 | cross-shaped opening/aperture |
| 10 | transverse slot |
| 11 | longitudinal slot |
| 12 | gearshifting levers |
| 13 | fulcrum |
| 14 | gearshifting fork |
| 15 | gearshifting lever arm |
| 16 | guide cylinder |
| 17 | pressure spring |

We claim:
1. A gearshifting system for shifting motor vehicle multi-speed transmissions comprising:

a plurality of gearshifting levers (12, 12'), each being pivotally mounted about a fulcrum (13, 13');

a portion of each lever (12, 12') on a first side of the fulcrum defining a gearshifting fork (14, 14'), with an end of the fork (14, 14") remote from the fulcrum being operatively connected to a corresponding gearshifting sleeve (30, 30');

a portion of each lever (12, 12') on a second side of said fulcrum defining a gearshifting arm (15, 15');

a gearshifting element (1, 4) for selectively engaging the gearshifting arms (15, 15') to selectively pivot the levers (12, 12') and selectively move said gearshifting sleeves (30, 30'), via the forks (14, 14');

wherein the gearshifting element comprises a single connecting rod (1) selectively reciprocally moveable relative to a housing wall (3) of the transmission in a direction parallel to rotational axes (33) of gears of the transmission (T) into a neutral and gearshifting positions;

each gearshifting arm (15, 15') has a coupling mechanism (4, 4') axially reciprocally mounted on an end of the arm (15, 15') remote from the fulcrum (13, 13'), for:

a) when the coupling mechanism (4, 4') is in an actuated state, immovably coupling the remote end of the gearshifting arm (15, 15') with the connecting rod (1), such that the connecting rod (1) pivots the corresponding lever (12, 12') and thereby moves the corresponding gearshifting sleeve to selectively engage and disengage a corresponding gear of the transmission; and b) when the coupling mechanism (4, 4') is in an unactuated state, uncoupling the remote end of the arm (15, 15') from the connecting rod (1) and simultaneously immovably coupling the remote end of the arm (15, 15') to the housing wall (3) of the transmission.

2. A gearshifting system according to claim 1, wherein said coupling mechanism (4, 16, 17, 4', 16', 17') each comprise a coupling bolt (4, 4') that is axially reciprocally mounted on the remote end of a corresponding gearshifting arm (15, 15') for reciprocal movement, in a direction along a longitudinal axis of the arm (15, 15') and perpendicular to the direction of movement of the connecting rod (1), for selectively coupling and uncoupling the arm (15, 15') with the connecting rod (1) and the housing wall (3).

3. A gearshifting system according to claim 2, wherein each coupling bolt (4, 4') comprises:

a coupling shaft (6, 6') axially reciprocally connected to the corresponding gearshifting arm (15, 15') and a coupling head (7, 7') mounted to and end of the coupling shaft (6, 6') remote from the fulcrum (13, 13') for selectively coupling with corresponding mating recesses (9, 10, 9', 10') in the connecting rod (1) and corresponding mating recesses (8, 8') in the housing wall (3).

4. A gearshifting system according to claim 3, wherein, when said connecting rod (1) is in the neutral position, the recesses (9, 10 , 9', 10') in the connecting rod (1) are aligned with the recesses (8, 8') in the housing wall (3).

5. A gearshifting system according to claim 2, wherein each recess (9, 10, 9', 10') in the connecting rod (1) defines a longitudinal slot (11, 11') that passes through the connecting rod (1) and extends in the direction of movement (2) of the connecting rod (1) and, when each coupling bolt is in the unactuated state, the corresponding coupling shaft (6, 6') extends through the corresponding longitudinal slot (11, 11') in the connecting rod (1) clear of engagement with the coupling rod (1), such that the corresponding coupling head (7, 7') is located on a side of the connecting rod (1) remote from the fulcrum (13, 13'), in engagement with the corresponding recess in the housing wall (3), such that upon movement of the coupling rod (1) the coupling shaft (6, 6') freely moves in the longitudinal slot (11, 11') relative to the connecting rod (1).

6. A gearshifting system according to claim 3, wherein each said coupling head (7, 7') is an elongate head perpendicularly attached to the remote end of the corresponding coupling shaft (6, 6') in a direction that extends perpendicularly across the direction of travel (2) of the connecting rod (1), defining a T-shape; and each recess (9 10, 9', 10') in the connecting rod (1) defines a longitudinal slot (11, 11') and an intersecting transverse slot, relative to the direction of travel of the connecting rod (1), that define a substantially cross-shaped opening that passes through the connecting rod (1), the transverse slot is sized and shaped to engage the corresponding coupling head (7, 7').

7. A gearshifting system according to claim 6, wherein the coupling shafts (6, 6') and the coupling heads (7, 7') have substantially identical circular cross-sections.

8. A gearshifting system according to claim 6, wherein the coupling shafts (6, 6') and the coupling heads (7, 7') have substantially identical rectangular cross-sections.

9. A gearshifting system according to claim 3, wherein each said coupling head (7, 7') is an elongate head perpendicularly attached to the remote end of the corresponding coupling shaft (6, 6'), in a direction that extends perpendicularly across the direction of travel (2) of the connecting rod (1), defining an L-shape; and each recess (9, 10, 11, 9', 10', 11') in the connecting rod (1) comprises a longitudinal slot (11, 11') and an intersecting transverse slot (10, 10'), relative to the connecting rod (1), that define a T-shaped opening that passes through the connecting rod (1).

10. A gearshifting system according to claim 3, wherein said housing wall (3) is an outer housing wall of the transmission (T).

11. A gearshifting system according to claim 10, wherein said mating recesses in the housing wall are defined by a stationary member (3) that is fixedly attached to an inner surface of the housing wall (3').

12. A gearshifting system according to claim 1, wherein said stationary member is fastened to one of an inner and an outer surface of a housing wall of the transmission.

13. A gearshifting system according to claim 1, wherein said connecting rod (1) is formed of a flat steel rod and is situated between the remote end of the gearshifting arms (15, 15") and the housing wall (3) of the transmission.

14. A gearshifting system according to claim 3, wherein one of the remote end of each gearshifting arm (15, 15') and each coupling shaft (6) is enlarged to form a guide member (16, 16') for reciprocally slidably mounting the coupling shaft (6, 6') to the corresponding arm (15, 15').

15. A gearshifting system according to claim 3, wherein the remote end of each gearshifting arm (15, 15') is enlarged forming a hollow guide cylinder (16, 16') in which the corresponding coupling shaft (6, 6') is reciprocally slidably received with a compression spring (17, 17') located between the coupling shaft (6, 6') and an inner end wall of the cylinder (16, 16') for biasing the coupling bolt (4, 4') into the unactuated position.

16. A gearshifting system according to claim 1, wherein a plurality of electromagnetic actuators selectively provide coupling forces to corresponding coupling bolts (4, 4') to selectively move the coupling bolts (4, 4') from the unactuated position to the actuated position in opposition to the compression spring (17, 17').

17. A gearshifting system according to claim 1, wherein a plurality of one of hydraulic or pneumatic actuating cylinders selectively provide coupling forces to corresponding coupling bolts (4, 4') to selectively move the coupling bolts (4, 4') from the unactuated position to the actuated position in opposition to the compression spring (17, 17').

18. A gearshifting system according to claim 16, wherein the electromagnetic actuators are located on a side of the transmission housing wall (3) remote from the fulcrums (13, 13') and act upon the coupling bolts through corresponding openings 8 in the housing (3) of the transmission.

19. A gearshifting system according to claim 17, wherein the actuating cylinders are located on a side of the transmission housing wall (3) remote from the fulcrums (13, 13') and act upon the coupling bolts through corresponding openings (8) in the housing (3) of the transmission.

* * * * *